United States Patent
Nemoto

(10) Patent No.: US 8,632,061 B2
(45) Date of Patent: Jan. 21, 2014

(54) ACTIVE VIBRATION ISOLATING SUPPORT APPARATUS

(75) Inventor: Hirotomi Nemoto, Saitama (JP)

(73) Assignee: Honda Motor Co., Ltd.

(*) Notice: Subject to any disclaimer, the term of this patent is extended or adjusted under 35 U.S.C. 154(b) by 691 days.

(21) Appl. No.: 12/731,797

(22) Filed: Mar. 25, 2010

(65) Prior Publication Data

US 2010/0244341 A1 Sep. 30, 2010

(30) Foreign Application Priority Data

Mar. 26, 2009 (JP) ................................. 2009-075359

(51) Int. Cl.
*F16F 1/00* (2006.01)

(52) U.S. Cl.
USPC ............ 267/140.14; 267/140.11; 267/140.12; 267/140.13; 267/140.15

(58) Field of Classification Search
USPC ................... 267/140.14–140.15; 702/54, 56
See application file for complete search history.

(56) References Cited

U.S. PATENT DOCUMENTS

| | | | |
|---|---|---|---|
| 5,638,305 A * | 6/1997 | Kobayashi et al. ............ 700/280 |
| 5,647,579 A * | 7/1997 | Satoh ........................ 267/140.14 |
| 5,939,625 A * | 8/1999 | Torii et al. ................... 73/117.01 |
| 6,256,545 B1 * | 7/2001 | Kimura et al. .................. 700/28 |
| 6,631,895 B2 | 10/2003 | Nemoto |
| 7,194,344 B2 * | 3/2007 | Gee et al. ......................... 701/22 |
| 2004/0232307 A1 * | 11/2004 | Nemoto et al. ................ 248/638 |
| 2005/0001365 A1 * | 1/2005 | Kon et al. ................. 267/140.14 |
| 2005/0006830 A1 * | 1/2005 | Nemoto ................... 267/140.14 |
| 2005/0006831 A1 * | 1/2005 | Abe ......................... 267/140.15 |
| 2005/0056981 A1 * | 3/2005 | Nemoto ................... 267/140.13 |
| 2005/0200061 A1 * | 9/2005 | Nemoto ................... 267/140.14 |
| 2007/0013116 A1 * | 1/2007 | Nemoto et al. .......... 267/140.14 |
| 2008/0106015 A1 * | 5/2008 | Fushimi et al. .......... 267/140.15 |
| 2008/0136074 A1 * | 6/2008 | Nemoto ................... 267/140.14 |
| 2009/0039577 A1 * | 2/2009 | Ishiguro et al. .......... 267/140.13 |
| 2009/0045560 A1 * | 2/2009 | Fueki et al. ............... 267/140.15 |

FOREIGN PATENT DOCUMENTS

| | | |
|---|---|---|
| EP | 2 023 008 A1 | 2/2009 |
| JP | 61-220926 | 10/1986 |
| JP | 2001-253251 | 9/2001 |
| JP | 2002-139095 | 5/2002 |
| JP | 2007-269049 A | 10/2007 |

* cited by examiner

*Primary Examiner* — Robert A Siconolfi
*Assistant Examiner* — James Hsiao
(74) *Attorney, Agent, or Firm* — Carrier Blackman & Associates, P.C.; Joseph P. Carrier; Jeffrey T. Gedeon

(57) ABSTRACT

In a so-called motoring state at the time of engine starting before actuating engine, there is a problem that a roll vibration, which is generated when an engine revolution speed Ne is at a predetermined engine revolution speed and vibrates the engine and the vehicle body largely, can not be suppressed. For this reason, the present invention provides an active vibration isolating support apparatus in which the roll vibration can be suppressed in the motoring state at the time of engine starting.

8 Claims, 8 Drawing Sheets

US 8,632,061 B2

ACTIVE VIBRATION ISOLATING SUPPORT APPARATUS

CROSS REFERENCE TO RELATED APPLICATION

The present application claims benefit of the filing dates of Japanese Patent Application No. 2009-075359 filed on Mar. 26, 2009 which is incorporated herein by reference.

BACKGROUND OF THE INVENTION

1. Field of the Invention

The present invention relates to an active vibration isolating support apparatus to elastically support an engine in a vehicle body.

2. Description of the Related Art

JP 2007-269049 A discloses an active vibration isolating support apparatus to optimally control an active control mount in a motor-assisted type hybrid vehicle regardless of an operating state of motor vibration suppression control.

According to JP 2007-269049 A, because the active vibration isolating support apparatus is provided with a control map changer to change phase correction control maps to generate waveforms for engine mount vibration suppression control depending on the presence or absence of a motor vibration suppression control signal supplied to a generator motor, it is possible to optimally control the active control mount by the generator motor depending on a state of vibration suppression control.

However, in the active vibration isolating support apparatus disclosed in JP 2007-269049 A, an engine to which the generator motor is united is supported by a vehicle body frame via an engine mount, vibration transmitted from the engine to the vehicle body frame is suppressed by coordination between the generator motor and the engine mount, and the concept of the above vibration suppression is limited to the case where the engine is under steady operation. That is, the vibration of the engine is suppressed when an engine revolution speed Ne is relatively high. In a so-called motoring state at the time of engine starting before actuating engine, there is a problem that a roll vibration, which is generated when an engine revolution speed Ne is at a predetermined engine revolution speed and vibrates the engine and the vehicle body largely, can not be suppressed.

For this reason, an object of the present invention is to provide an active vibration isolating support apparatus in which the roll vibration can be suppressed in the motoring state at the time of engine starting.

SUMMARY OF THE INVENTION

A first aspect of the present invention provides an active vibration isolating support apparatus in which an engine is elastically supported in a vehicle body, and a controller estimates a vibrational state of the engine based on an output from a sensor to detect a revolution change of the engine and drives an actuator to extend and contract so as to suppress transmission of vibration, including: a motoring state detecting means to detect that the engine is in a motoring state at the time of the engine starting before actuating the engine; a natural roll vibration detecting means to detect occurrence of a natural roll vibration based on a detected revolution speed of the engine; and a natural roll vibrational state information obtaining means to obtain a natural roll vibrational state information based on an increasing rate in the revolution speed of the engine when the natural roll vibration detecting means judges that the natural roll vibration has been started, in which natural roll vibration suppression control is performed based on the obtained natural roll vibrational state information.

According to the first aspect of the present invention, because the natural roll vibration is suppressed depending on the natural roll vibrational state information based on the increasing rate in the revolution speed of the engine when the natural roll vibration is judged to have been started in the motoring state, for example, the natural roll vibration also can be suppressed in the motoring state.

A second aspect of the present invention provides the active vibration isolating support apparatus of the first aspect of the present invention, further including: a storage means to store natural roll vibration controlling data for first and second cycles of the natural roll vibration in advance, in which when an occurrence of the natural roll vibration of the engine is detected, the natural roll vibration suppression control is performed for the first and second cycles of the natural roll vibration using the stored natural roll vibration controlling data, and the natural roll vibration suppression control is performed for third and subsequent cycles of the natural roll vibration depending on the natural roll vibrational state information obtained for the first and second cycles.

According to the second aspect of the present invention, because the natural roll vibration controlling data for the first and second cycles of the natural roll vibration is stored in the storage means, for example, even if a computing speed of a microcomputer is limited, the natural roll vibration suppression control can be performed from the beginning of the natural roll vibration.

In addition, it is desired that the natural roll vibrational state information includes a period and a control gain of the natural roll vibration which is preset based on the increasing rate in the revolution speed.

BRIEF DESCRIPTION OF THE DRAWINGS

FIG. 8A is an illustration of a temporal transition of an engine revolution speed Ne; where FIG. 8B is an illustration of an temporal transition of the engine vibration; and where FIG. 8C is an illustration of a temporal transition of an ACM supplied current.

DETAILED DESCRIPTION OF THE PREFERRED EMBODIMENT

Hereinafter, referring to FIGS. 1-8, embodiments of the present invention will be described.

(Whole Structure of Active Vibration Isolating Support Apparatus)

Figure 1:
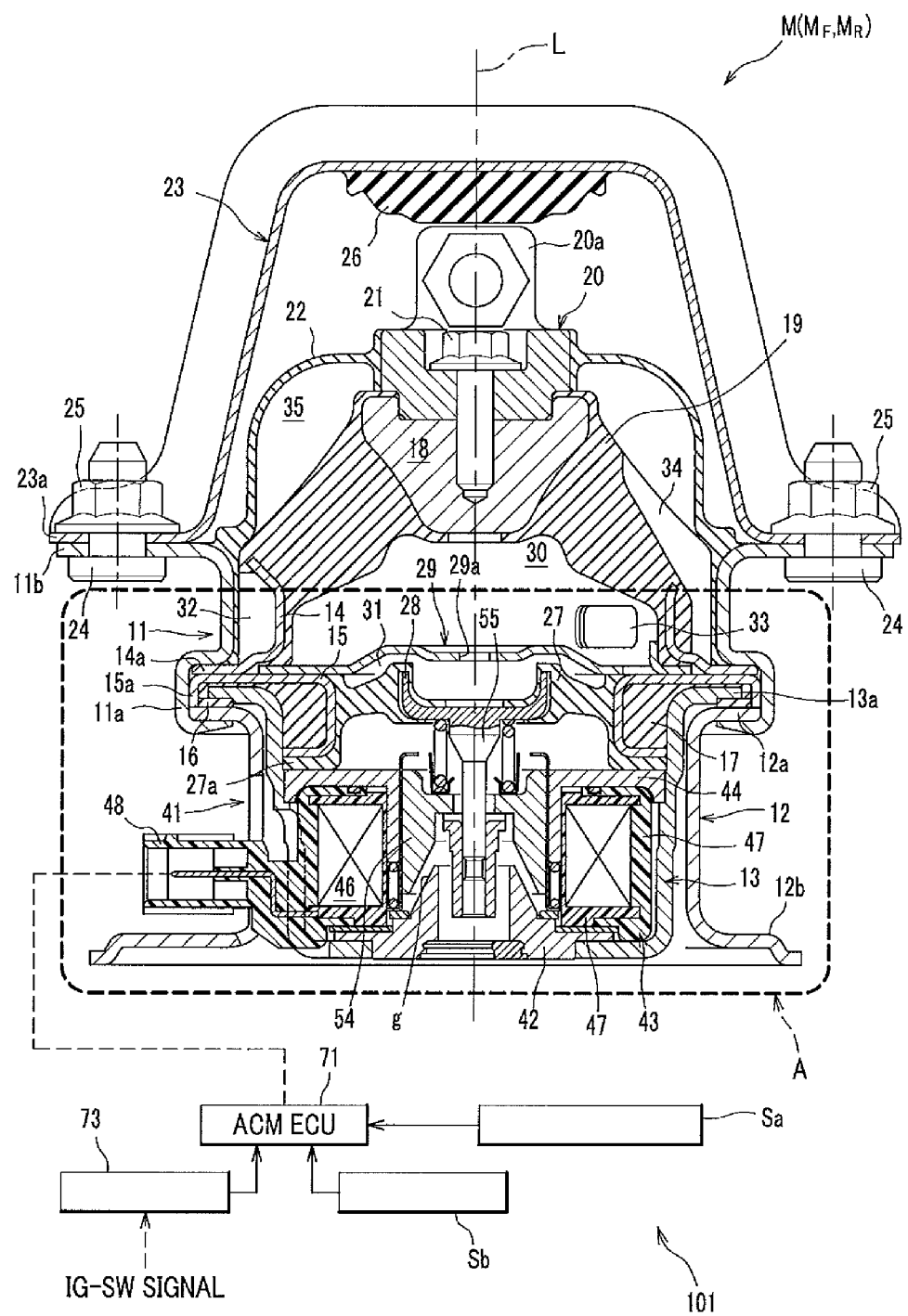
FIG. 1 is a longitudinal sectional view showing a structure of an active control mount of an active vibration isolating support apparatus in accordance with an embodiment.
Figure 2:
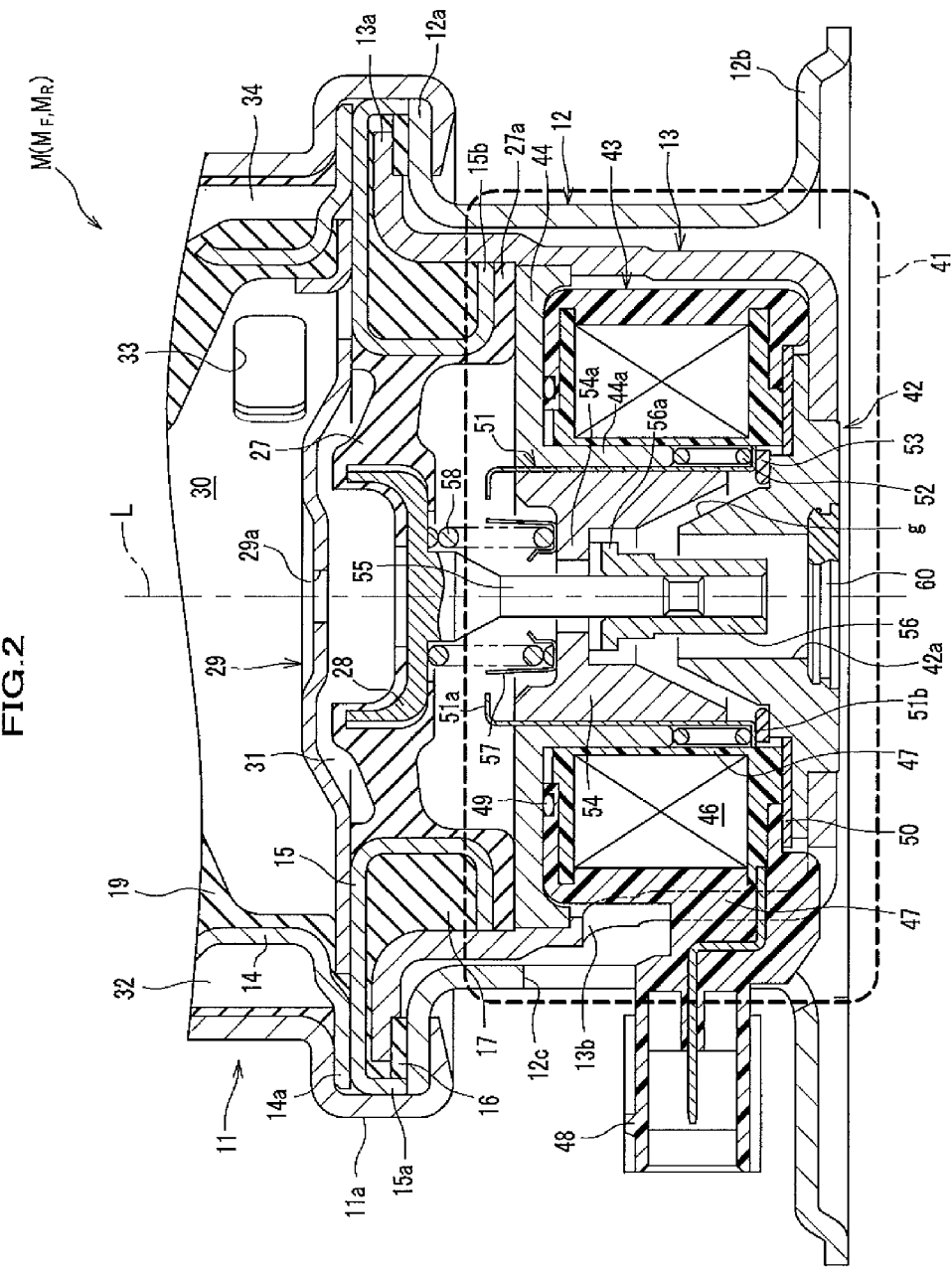
FIG. 2 is a partial enlarged view of a portion A in FIG. 1.

FIG. 1 is a longitudinal sectional view showing a structure of an active control mount of an active vibration isolating support apparatus in accordance with an embodiment, and FIG. 2 is a partial enlarged view of a portion A in FIG. 1.

The active vibration isolating support apparatus 101 according to the present invention can be driven to extend and contract in vertical direction, and includes active control mounts $M_F$ and $M_R$ which are used to elastically support an engine 102 (see FIG. 3) of a vehicle V in a vehicle body frame, and are disposed ahead of and behind the engine 102.

Hereinafter, "active control mounts $M_F$ and $M_R$" are referred to as an "active control mount M" when it is not necessary to distinguish between the engine mounts $M_F$ and the engine mounts $M_R$.

Here, for example, the engine 102 is a so-called side-ways mounted transversal V engine with six-cylinders in which one end of a crankshaft (not shown) is connected to a transmission, and the crankshaft is disposed in a direction transverse to a body of the vehicle. Therefore, the engine 102 is disposed in a direction so as to the crankshaft is disposed in a direction transverse to a body of the vehicle, and the active control mounts $M_F$ and $M_R$ are disposed ahead of and behind the engine 102 as a pair to reduce a roll vibration.

The active control mounts $M_F$ and $M_R$ are mounted on a location below the center of gravity of the engine 102 to reduce the roll vibration in a front-rear direction of the engine 102, and to elastically support the engine 102 in the vehicle body of the vehicle.

As shown in FIG. 1, the active vibration isolating support apparatus 101 includes an active control mount ECU (electronic control unit) 71 to control the active control mounts M (in FIG. 1, only one active control mount M is shown). Hereinafter, the active control mount ECU 71 (controller) is referred to as an "ACM (Active Mount Control) ECU 71".

The ACMECU 71 is connected to an engine control ECU 73 (hereinafter, referred to as an "engine ECU 73") to an engine control revolution speed Ne or output torque, etc. of the engine via a communication line such as CAN (Controller Area Network).

Further, the ACMECU 71 receives an engine revolution speed (Ne) signal, crank pulse signals, TDC (Top Dead Center) signals to exhibit timing of the top dead center for each cylinder, a cylinder-off signal to exhibit either all-cylinder operation or selective-cylinder operation the V engine with six-cylinders 102 is in, an ignition switch signal (hereinafter, referred to as an "IG-SW signal") to exhibit the engine starting, a fuel injection signal indicating a timing of fuel injection, and an accelerator position sensor signal from the engine ECU 73 via the communication line.

For reference's sake, in the case of the six-cylinder engine, the crank pulse is output 24 times per revolution of the crankshaft, that is, once every 15 degrees of crank angle.

(Structure of the ACM)

As shown in FIG. 1, an active control mount M has a structure that is substantially symmetrical with respect to an axis L, and includes a substantially cylindrical upper housing 11, a substantially cylindrical lower housing 12 disposed below the housing 11, an upwardly opening substantially cup-shaped actuator case 13 housed in the lower housing 12, a diaphragm 22 connected on the upper housing 11, an annular first elastic body support ring 14 housed in the upper housing 11, a first elastic body 19 connected on the first elastic body support ring 14, an annular second elastic body support ring 15 housed in the actuator case 13, a second elastic body 27 connected to an inner peripheral side of the second elastic body support ring 15, and a driving unit (actuator) 41 housed in the actuator case 13 and disposed below the second elastic body support ring 15 and the second elastic body 27.

Between a flange unit 11a at the lower end of the upper housing 11 and a flange unit 12a at the upper end of the lower housing 12, a flange unit 13a on the outer periphery of the actuator case 13, an outer peripheral unit 14a of the first elastic body support ring 14, and an upper and outer peripheral unit 15a of a second elastic body support ring 15 are superimposed and joined by crimping. In this process, an annular first floating rubber 16 is disposed between the flange unit 12a and the flange unit 13a, and an annular second floating rubber 17 is disposed between an upper side of the flange unit 13a and lower side of the upper and outer peripheral unit 15a, so that the actuator case 13 is floatingly supported such that it can move up and down relative to the upper housing 11 and the lower housing 12.

The first elastic body support ring 14, and a first elastic body support boss 18 disposed in a concave unit provided on the upper side of a first elastic body 19 are joined by vulcanization bonding at the lower and upper ends of the first elastic body 19 made of a thick rubber. Further, a diaphragm support boss 20 is fixed to an upper face of the first elastic body support boss 18 by a bolt 21. An outer peripheral unit of a diaphragm 22 whose inner peripheral unit is joined by vulcanization bonding to the diaphragm support boss 20, is joined by vulcanization bonding to the upper housing 11.

An engine mounting unit 20a integrally formed with an upper face of the diaphragm support boss 20 is fixed to the engine 102. (Detailed method for fixing is not shown.) Also, a vehicle body mounting unit 12b at the lower end of the lower housing 12 is fixed to the vehicle body frame (not shown).

A flange unit 23a at the lower end of a stopper member 23 is joined to a flange unit 11b by bolts 24 and nuts 25 at the upper end of the upper housing 11. The engine mounting unit 20a provided on the diaphragm support boss 20 faces a stopper rubber 26 attached to an upper inner face of the stopper member 23 so that the engine mounting unit 20a can touch the stopper rubber 26.

By such a structure, when a large load is input from the engine 102 to the active control mount M, the engine mounting unit 20a touches the stopper rubber 26, thereby reducing excessive displacement of the engine 102.

An outer peripheral unit of a second elastic body 27 made of a membranous rubber is joined to the inner peripheral face of the second elastic body support ring 15 by vulcanization bonding. At a center portion of the second elastic body 27, a movable member 28 is joined by vulcanization bonding so that the upper unit thereof is embedded in.

And, disc-shaped partition member 29 is fixed between an upper face of the second elastic body support ring 15 and the lower unit of the first elastic body support ring 14. A first liquid chamber 30 defined by the first elastic body support ring 14, the first elastic body 19, and the partition member 29, and a second liquid chamber 31 defined by the partition member 29 and the second elastic body 27, communicate with each other via a through hole 29a formed in the center of the partition member 29.

The outer peripheral unit 27a of the second elastic body 27 is held between a lower and outer peripheral unit 15b of the second elastic body support ring 15 (see FIG. 2) and a yoke 44 described below to function as a seal.

Also, an annular through passage 32 is formed between the first elastic body support ring 14 and the upper housing 11. The through passage 32 communicates with the first liquid chamber 30 via a through hole 33, and communicates via a through gap 34 with a third liquid chamber 35 defined by the first elastic body 19 and the diaphragm 22.

As shown in FIG. 2, the coil assembly 43 includes a cylindrical coil 46 disposed between the stationary core 42 and the yoke 44, and a coil cover 47 covering the outer periphery of the coil 46. The coil cover 47 is integrally formed with a connector 48 running through openings 13b and 12c (see FIG. 2) formed in the actuator case 13 and the lower housing 12 and extending outward, and an electric supply line is connected to the connector 48 to supply electric power to the coil 46.

The yoke 44 has an annular flange on the upper side of the coil cover 47, and has a cylindrical unit 44a (see FIG. 2) extending from the inner peripheral unit of the flange downward. The yoke 44 has, as it were, a configuration of cylinder having flange. A seal 49 (see FIG. 2) is disposed between an upper face of the coil cover 47 and a lower face of the annular flange of the yoke 44. A seal 50 is disposed between a lower face of the coil cover 47 and an upper face of the stationary core 42. These seals 49 and 50 can prevent water or dust from entering an internal space of the driving unit 41 via the openings 13b and 12c formed in the actuator case 13 and the lower housing 12.

A thin cylindrical bearing member 51 is fitted, in a vertically slidable manner, into an inner peripheral face of a cylindrical unit 44a of the yoke 44. An upper flange 51a and a lower flange 51b are formed at the upper end and the lower end respectively of the bearing member 51, the upper flange 51a being bent radially inward, the lower flange 51b being bent radially outward.

A set spring 52 is disposed in a compressed state between the lower flange 51b and the lower end of the cylindrical unit 44a of the yoke 44. The bearing member 51 is supported by the yoke 44 by the lower flange 51b being pressed against the upper face of the stationary core 42 via an elastic body 53 disposed between the lower face of the lower flange 51b and the stationary core 42 by means of an elastic force of the set spring 52.

A substantially cylindrical movable core 54 is fitted, in a vertically slidable manner, into an inner peripheral face of the bearing member 51. Further, the stationary core 42 and the movable core 54 have hollow center portions on the axis L respectively, and a substantially cylindrical rod 55, which connects to the center of the movable member 28 (on the axis L) and extends downwardly, is disposed there. A nut 56 is tightened around the lower end of the rod 55. The nut 56 has a hollow unit at its center, the upper end of the hollow unit opens upward, and receives the lower end of the rod 55 in the hollow unit. An upper end 56a of the nut 56 has a slightly larger outer diameter than that of its lower portion. An upper face of the upper end 56a touches the lower face of the spring washer 54a of the movable core 54.

Also, a set spring 58 is disposed in a compressed state between the spring washer 54a of the movable core 54 and a lower face of the movable member 28. The lower face of the spring washer 54a of the movable core 54 is fixed by being pressed against the upper end 56a of the nut 56 by means of an elastic force of the set spring 58. In this state, the conical inner peripheral unit of the cylindrical unit of the movable core 54 and the conical outer peripheral unit of the stationary core 42 face each other across a conical air gap g.

Relative to the rod 55, the nut 56 is tightened in an opening 42a formed in the center of the stationary core 42 with position adjustment in vertical direction. This opening 42a is blocked by a rubber cup 60.

(Operation of Active Control Mount)

The operation of the active control mount M configured as described above will be explained (hereinafter, see FIGS. 1-2 if necessary).

The ACMECU 71 is connected to crank pulse sensors Sa (see FIG. 1) to detect crank pulses which are output 24 times per revolution of the crankshaft, that is, once every 15 degrees of crank angle associated with rotation of the crankshaft (not shown) in the engine 102 (see FIG. 3), and TDC sensors Sb (see FIG. 1) to output the TDC signal which is output 3 times per revolution of the crankshaft, that is, every top dead center of each of the cylinders. The ACMECU 71 estimates vibrational state of the engine based on the crank pulses from the crank pulse sensors Sa and the TDC signal from the TDC sensors Sb so as to control power supply to a driving unit 41 (actuator 41) of the active control mounts $M_F$ and $M_R$ of the active vibration isolating support unit 101.

A coil 46 of the driving unit 41 is excited by power supply control from the ACMECU 71 so as to move a movable core 54 by sucking force to move a movable member 28 downwardly. Associated with movement of this movable member 28, a second elastic body 27 to define a second liquid chamber 31 is moved downwardly so as to increase the capacity of the second liquid chamber 31. Conversely, when the coil 46 is demagnetized, the second elastic body 27 is deformed upwardly by elastic deformation of itself, the movable member 28 and the movable core 54 move upwardly, and the capacity of the second liquid chamber 31 decreases.

However, the engine shake vibration is caused by a resonance between the vehicle body and the engine system in a coupled system including the engine, the vehicle body, and a suspension. When low frequency (for example, 7-20 Hz) engine shake vibration occurs while the vehicle is traveling, the first elastic body 19 is deformed by a load input from the engine 102 via the diaphragm support boss 20 and the first elastic body support boss 18, thus changing the capacity of the first liquid chamber 30, so that a liquid moves to and fro between the first liquid chamber 30 and the third liquid chamber 35 via the through passage 32. In this state, when the capacity of the first liquid chamber 30 increases/decreases, the capacity of the third liquid chamber 35 decreases/increases correspondingly, and this change in the capacity of the third liquid chamber 35 is absorbed by elastic deformation of the diaphragm 22. At this time, the shape and the dimensions of the through passage 32 and the spring constant of the first elastic body 19 are set so that a low spring constant and high attenuation force are exhibited in the frequency region of the engine shake vibration. Therefore, it is possible to effectively reduce the vibration transmitted from the engine 102 to the vehicle body frame.

Further, in the frequency region of the engine shake vibration, when the engine 102 is in a steady rotating state, the driving unit 41 is maintained in a non-operating state.

When there is vibration having a higher frequency than that of the above-mentioned engine shake vibration, that is, vibration during idling or vibration during selective-cylinder operation due to rotation of crankshaft (not shown) of the engine 102, the liquid within the through passage 32 providing communication between the first liquid chamber 30 and the third liquid chamber 35 becomes stationary and a vibration isolating function cannot be exhibited; the driving units 41 of the active control mounts $M_F$ and $M_R$ are therefore driven to exhibit a vibration isolating function.

For reference's sake, the idle vibration is caused by low-frequency vibrations of a floor, seats, and a steering wheel during idling. For example, BURUBURU vibration is caused in a four-cylinder engine in a range of 20-35 Hz, and in a six-cylinder engine in a range of 30-50 Hz, and YUSAYUSA vibration is caused in a range of 5-10 Hz by uneven combustion, and is a main factor of roll vibration in engine.

Therefore, in order to drive the driving unit 41, the active vibration isolating support apparatus 101 (see FIG. 1) including the active control mounts $M_F$ and $M_R$ shown in FIG. 2 controls the power supplied to the coils 46 based on signals from a crank pulse sensor Sa, a TDC sensor Sb, and an engine ECU 73.

(Structure of ACMECU)

Next, referring to FIGS. 1-3, the structure of the ACMECU will be explained.

Figure 3:
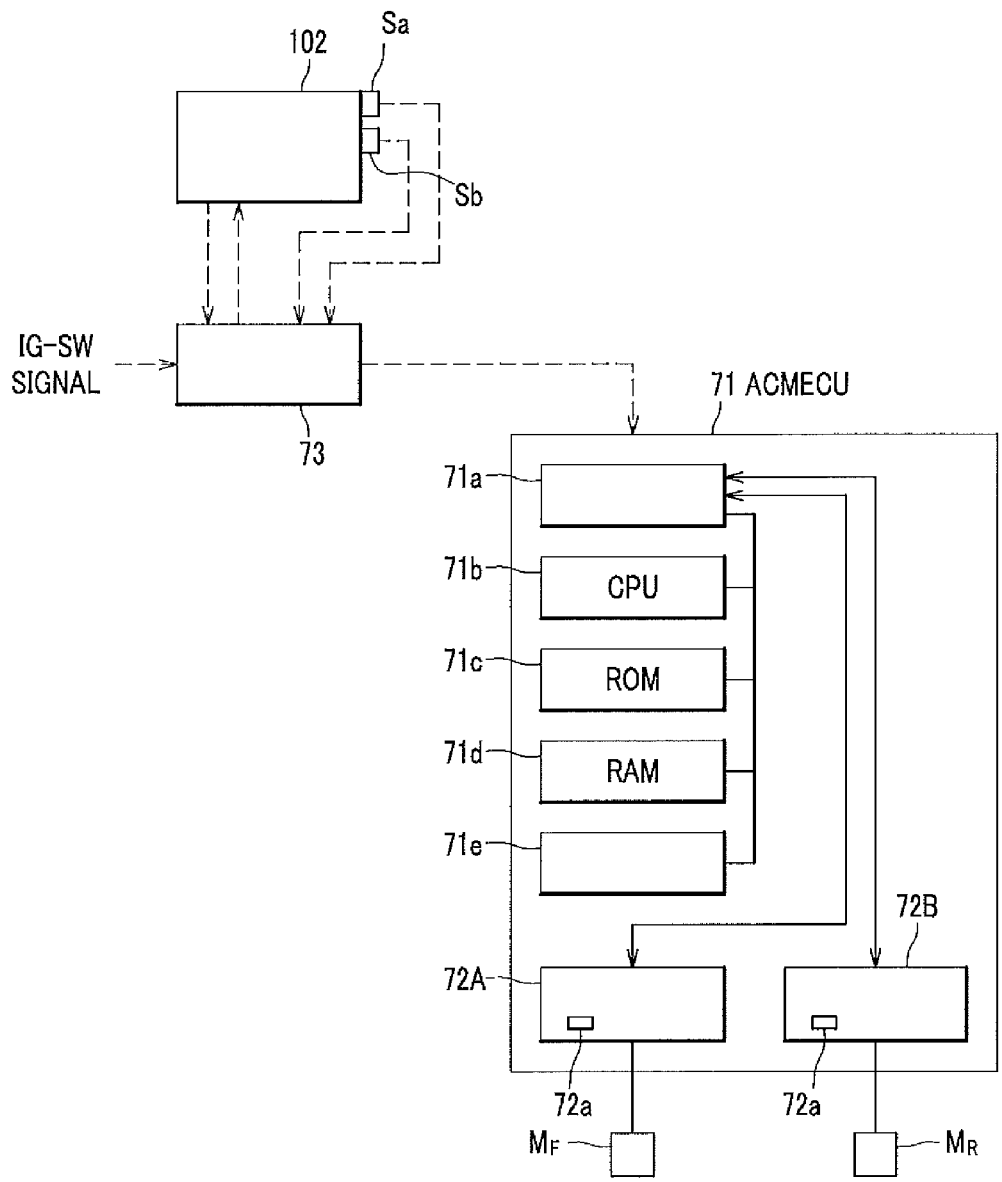
FIG. 3 is a block diagram showing an interconnection among a crank pulse sensor, a TDC sensor, an engine ECU, and an ACMECU.

FIG. 3 is a block diagram showing the interconnection among a crank pulse sensor, a TDC sensor, an engine ECU, and an ACMECU.

The crank pulse sensor Sa detects a crank pulse generated by a crankshaft (not shown) of the engine 102. In the case of a six-cylinder engine, the crank pulse is generated every 15 degrees of crank angle in the engine 102, and the crank pulse sensor Sa detects this crank pulse to send it to the engine ECU 73. The TDC sensor Sb outputs the TDC signal which is output 3 times per revolution of the crankshaft, that is, every top dead center of each of the cylinders.

The engine ECU 73 is composed of a microcomputer having CPU (Central Processing Unit) (not shown), ROM (Read Only Memory), RAM (Random Access Memory), etc., and peripheral circuitry so as to control the engine revolution speed Ne, and to calculate the engine revolution speed Ne via the crank pulse sensor Sa being provided with the engine 102. The engine ECU 73 also has the ability to send the detected engine revolution speed Ne and the crank pulse from the crank pulse sensor Sa, and the TDC sensor Sb to the ACMECU 71 via the communication line.

Further, when the engine 102 is started by an electric motor (not shown), which is incorporated in the engine 102 and is referred to as a starter, using the IG-SW signal, the engine ECU 73 determines which cylinder should be a first exploded cylinder (hereinafter, referred to as an "initially exploded cylinder") at the time of a first explosion (hereinafter, referred to as an "initial explosion") of the engine 102 based on the crank pulse signals and the TDC signal. To the initially exploded cylinder, the engine ECU 73 controls a fuel injection to be done first. On this occasion, the cylinder to which the fuel injection is done first is referred to as an "initially injected cylinder".

The engine ECU 73 outputs a signal to specify the initially injected cylinder to the ACMECU 71 via the communication line provided in the vehicle.

Also, the engine ECU 73 outputs a fuel injection signal indicating fuel injection to the ACMECU 71.

In addition, instead of the starter incorporated in the engine 102, an assist motor to assist the engine 102 by its driving force in an hybrid engine can be used.

The ACMECU 71 is composed of a microcomputer having CPU 71b, ROM 71c, RAM 71d, a storage device 71e such as a nonvolatile memory, a peripheral circuitry such as a signal input/output part 71a, and power supply parts 72A and 72B, etc.

The signal input/output part 71a receives an engine revolution speed (Ne) signal, crank pulse signals, TDC signals, a signal to specify the initially injected cylinder, and the fuel injection signal etc. from the engine ECU 73, and sends the above signals to the CPU 71b. Also, the signal input/output part 71a receives a power supply control signal to control the driving unit 41 of the active control mounts $M_F$ and $M_R$ from the CPU 71b, and sends the signal to the power supply parts 72A and 72B.

The power supply part 72A includes a switching circuit (not shown) to supply current to the coil 46 (see FIG. 2) provided in the active control mount $M_F$, and a current sensor (not shown) to detect current flowing through the coil 46 in reality. The switching circuit of the power supply part 72A is controlled by the CPU 71b, and the power supply part 72A supplies DC-current from a battery to the coil 46 via the connector 48 (see FIG. 2). The power supply part 72B has a similar structure.

And, the CPU 71b is operated in accordance with a computer program stored in the ROM 71c. Also, the storage device 71e stores necessary data to control the active control mounts $M_F$ and $M_R$, etc.

In the driving unit 41 of the active control mount M configured as shown in FIG. 2, when current does not flow through the coil 46, a movable member 28 is moved upwardly by elastic restorative force of a second elastic body 27. Also, a nut 56 pushes a movable core 54 up to form a gap g between the movable core 54 and the stationary core 42.

On the other hand, when current is supplied from the ACMECU 71 to the coil 46, magnetic flux lines generated by the coil 46 pass through the yoke 44, the movable core 54, and the gap g in up and down direction to form a closed circuit fed back to the stationary core 42 and the coil 46, thereby moving the movable core 54 downwardly by sucking force. At this time, the movable core 54 moves the movable member 28 downwardly via the nut member 25 fixed to the rod 55 of the movable member 28 so as to deform the second elastic body 27 downwardly. As a result, since the capacity of the second liquid chamber 31 (see FIG. 1) increases, a liquid in the first liquid chamber 30 compressed by load from the engine 102 (see FIG. 1) flows into the second liquid chamber 31 through the through hole 29a of the partition member 29 to reduce load transmitted from the engine 102 to the vehicle.

Conversely, when supplying current to the coil 46 is stopped, the movable core 54 is released from the downward sucking force, the second elastic body 27 is deformed upwardly by elastic deformation of itself, and the movable core 54 is pulled up via the nut 56 fixed to the rod 55 and is moved upwardly. As a result, a gap g is formed. At this time, second elastic body 27 is moved upwardly. As a result, since the capacity of the second liquid chamber 31 decreases, a liquid in the first liquid chamber 30 compressed by load from the engine 102 flows into the second liquid chamber 31 through the through hole 29a of the partition member 29 to reduce load transmitted from the engine 102 to the vehicle.

As described above, the ACMECU 71 can control vertical motion of the movable member 28 by controlling the current supplied to the coil 46 so as not to transmit the roll vibration of the engine 102 to the vehicle body frame.

(Operation of ACMECU)

Next, referring to FIGS. 4-8, the operation of ACMECU 71 will be explained.

Figure 4:
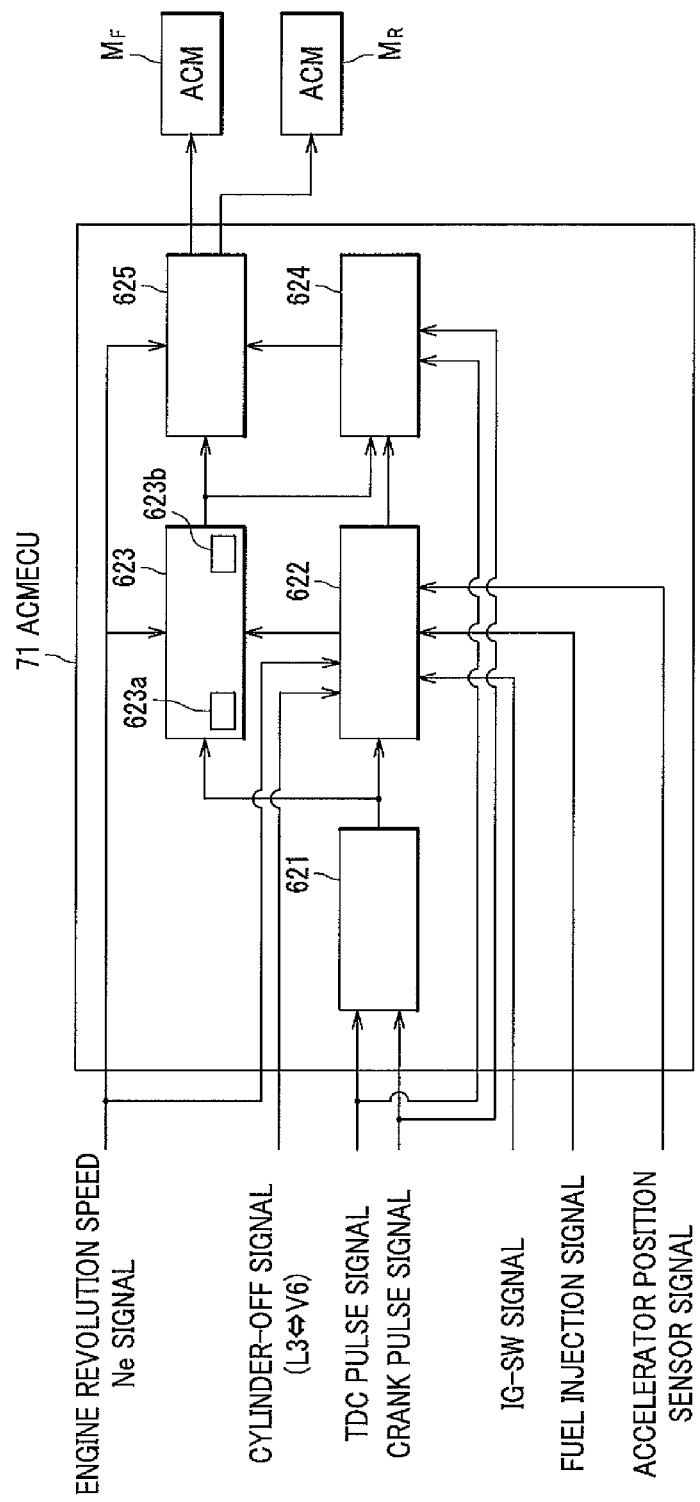
FIG. 4 is a functional structural block diagram of the ACMECU.

FIG. 4 is a functional structural block diagram of the ACMECU.

A function of each of the functional structural blocks in the ACMECU 71 is realized by a CPU 71b running programs stored in a ROM 71c (see FIG. 3). Concretely, the ACMECU 71 includes a crank pulse interval calculating unit 621, an engine revolution mode determination unit (a motoring state detecting means) 622, a vibrational state estimating unit (a natural roll vibration detecting means, and a natural roll vibrational state information obtaining means) 623, a phase detecting unit 624, and an actuator driving control unit 625.

The crank pulse interval calculating unit 621 calculates an interval of the crank pulse based on an internal clock signal of the CPU 71b, a crank pulse signal and a TDC pulse signal from the engine ECU 73.

The crank pulse interval calculated by the crank pulse interval calculating unit 621 is sent to the engine rotational mode determining unit 622 and the vibrational state estimating unit 623.

The engine revolution speed Ne signal, the cylinder-off signal, the IG-SW signal, the accelerator position sensor signal, the crank pulse interval, and fuel injection signal are sent from the engine ECU 73 to the engine rotational mode determining unit 622.

The engine rotational mode determining unit 622 detects a motoring state by the starter at the time of engine starting or the engine 102 starting to determine a rotational mode of the engine 102 as the motoring state or an active state, monitors increasing in the engine revolution speed Ne, determines idling state when the engine revolution speed Ne is beyond the predetermined engine revolution speed Ne based on these signals, determines the operational state of the engine 102 as an all-cylinder operation state or a selective cylinder operation state based on cylinder-off signal, and determines idling state based on the accelerator position sensor signal.

Figure 6:
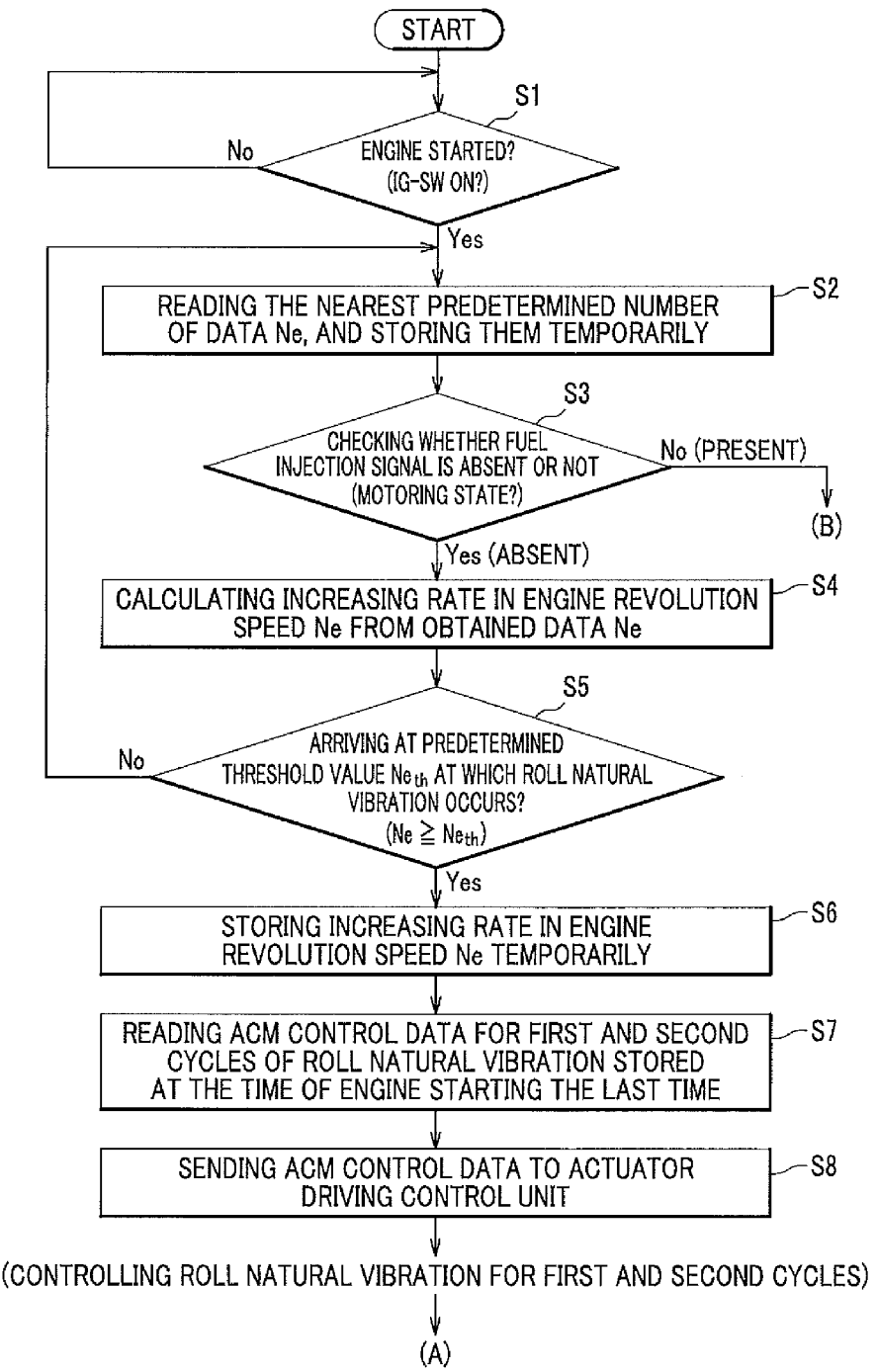
FIG. 6 is a flowchart showing a process of an ACM control (natural roll vibration suppression control) for the natural roll vibration at the time of engine starting.
Figure 7:
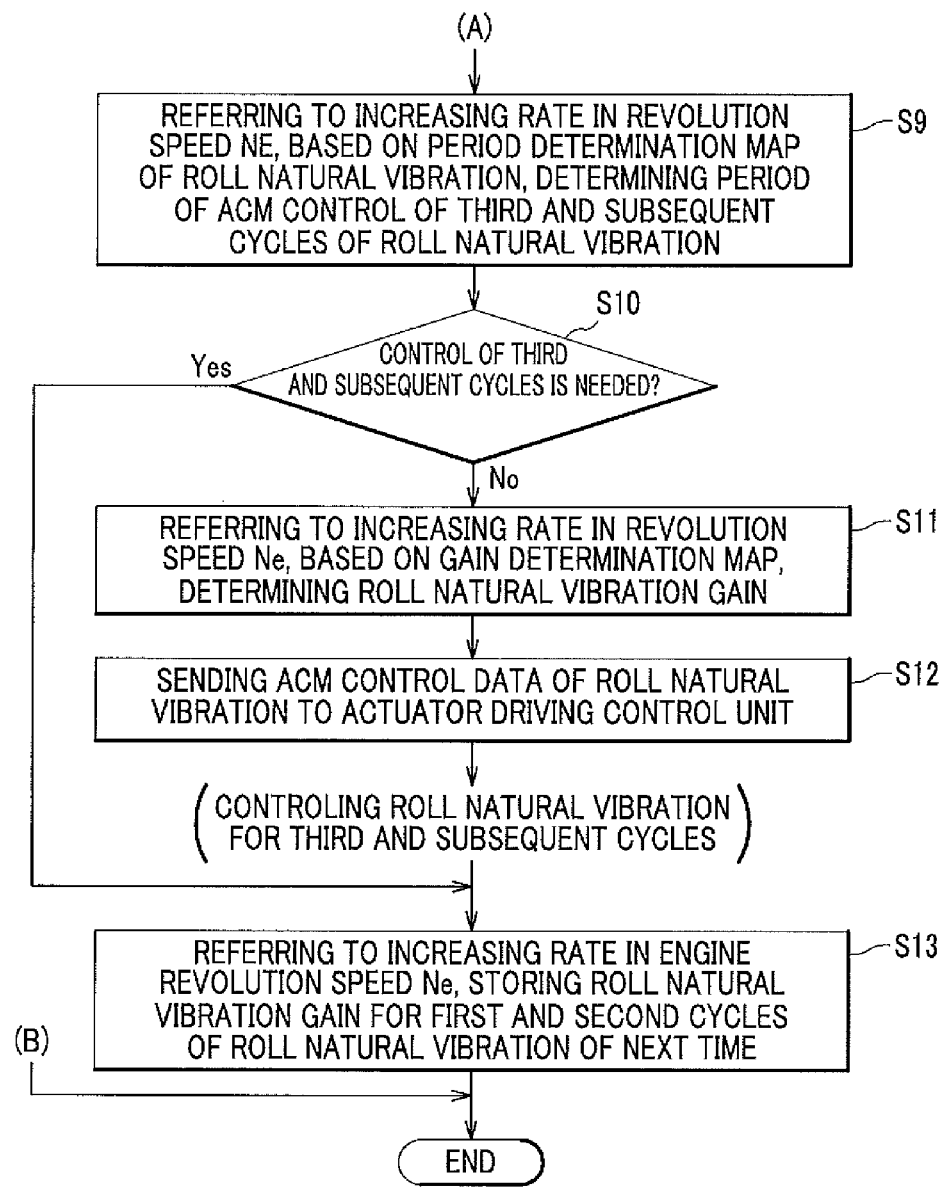
FIG. 7 is a flowchart showing a process of the ACM control (natural roll vibration suppression control) for the natural roll vibration.

Also, in the case where the engine is started by the starter, in a so-called motoring state at the time of engine starting before actuating engine, when the engine revolution speed Ne comes close to a predetermined threshold value $Ne_{th}$, a vibration occurs at a natural vibration frequency (a roll eigenvalue) determined by a weight of the engine (here, a weight of the engine and a transmission) and a spring constant of the engine mount. Here, the above vibration is referred to as a natural roll vibration in the motoring state. Referring to FIGS. 6-7, a process in which an occurrence of this natural roll vibration is detected so as to perform the ACM control at the time of engine starting will be described later.

The natural roll vibration in the motoring state at the time of engine starting corresponds to "natural roll vibration" in claims.

(ACM Control)

When the engine rotational mode determining unit 622 determines the rotational mode as idling state, all-cylinder operation state, or selective cylinder operation state, the vibrational state estimating unit 623 detects the revolution change of the crankshaft from the crank pulse interval based on the above determination, calculates a magnitude of engine vibration, and a cycle of engine vibration from a peak-to-peak value of the revolution change, and send the cycle and magnitude of the engine vibration, and timing of the peak value of the revolution change of the crankshaft, etc. to the actuator driving control unit 625 and the phase detector 624. At this time, the above values are sent according to a flag signal of the rotational mode of the engine 102 received from the engine rotational mode determining unit 622. That is, since the engine E is a V-type six-cylinder engine, in the case of all-cylinder operation state, the vibration is estimated as third component of engine vibration, and in the case of selective cylinder operation state, the vibration is estimated as 1.5th order engine vibration. Since the method for estimating this vibrational state is disclosed in, for example, "111 Development of active engine mount", JSAE Annual Congress (Autumn), Sep. 18, 2003, detailed description will be omitted.

The vibrational state estimating unit 623 includes a data unit 623a which stores a period determination map of the natural roll vibration and a gain determination map of the natural roll vibration, and a storage unit (a storage means) 623b which stores a gain of a determined natural roll vibration.

Also, in the case where the determination of the revolution mode from the engine revolution mode determination unit 622 is the "motoring state at the time of engine starting (a period from the time when the engine 102 is revolved by the starter to the time when a voluntary revolution begins, i.e., the engine is actuated)", the vibrational state estimating unit 623 outputs the natural roll vibration gain (the natural roll vibration controlling data) for first two cycles (first and second cycles), which is a part of a ACM control data for the natural roll vibration stored in the storage unit 623b the last time, to the actuator driving control unit 625, and outputs a start signal of the natural roll vibration suppression control in the motoring state to the phase detecting unit 624.

Figure 5:
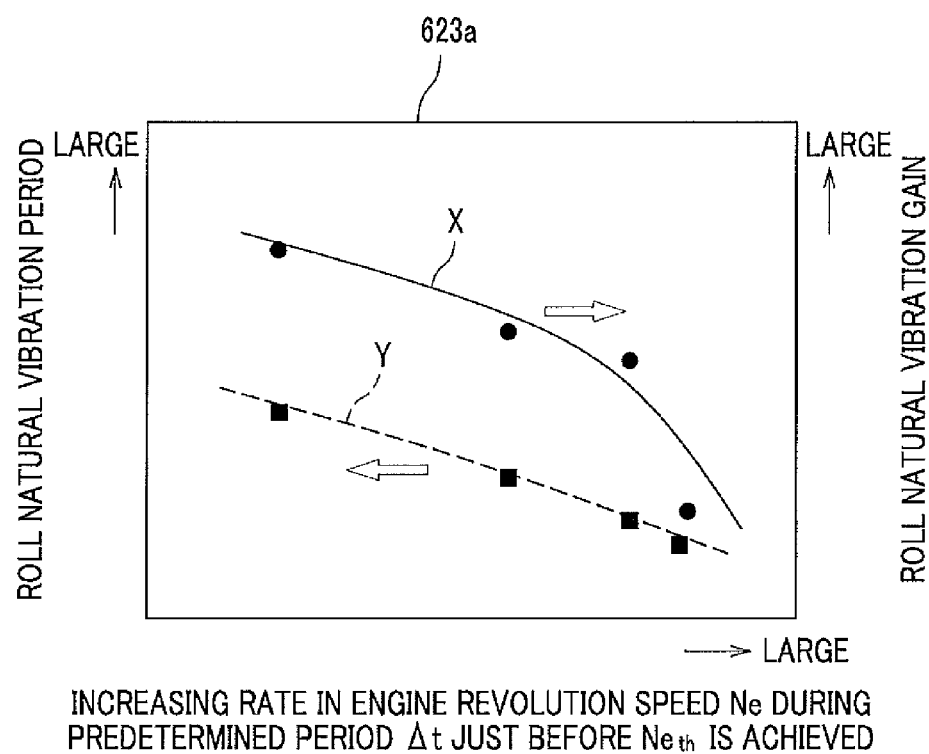
FIG. 5 is an illustration of a natural roll vibration map.

Here, the ACM control data means a data indicating the natural roll vibration gain to increase the gain and suppress the magnitude of the natural roll vibration depending on the magnitude of the natural roll vibration, and the natural roll vibration period which is a control period to suppress the natural roll vibration. In order to determine such ACM control data by the vibrational state estimating unit 623, for example, as shown in FIG. 5, the data unit 623a stores the period determination map of the natural roll vibration, and the gain determination map of the natural roll vibration.

The natural roll vibration period is set by, for example, a number of cycles during which the natural roll vibration is controlled to be suppressed.

In addition, the period determination map of the natural roll vibration, and the gain determination map of the natural roll vibration may be referred to collectively as "natural roll vibration map". The natural roll vibration map will be explained in detail later.

Also, when the vibrational state estimating unit 623 receives a determination of the engine starting from the engine revolution mode determination unit 622, the vibrational state estimating unit 623 monitors a change in the engine revolution speed Ne. Also, at the time when it is determined that the engine revolution speed Ne exceeds the predetermined threshold value $Ne_{th}$ at which the natural roll vibration occurs, the vibrational state estimating unit 623 refers to predetermined number of the increasing rates in the engine revolution speed Ne during the nearest period ascended from the time, determines the period (frequency) of the natural roll vibration and the gain of the natural roll vibration for the natural roll vibration of this time based on the period determination map of the natural roll vibration (see FIG. 5) and the gain determination map of the natural roll vibration (see FIG. 5) stored in the data unit 623a, and outputs the period (frequency) and the gain to the phase detecting unit 624 and the actuator driving control unit 625. Also, the gain of the natural roll vibration determined this time is stored in the storage unit 623b.

Here, the period of the natural roll vibration and the gain (control gain) of the natural roll vibration correspond to "natural roll vibrational state information" in claims.

FIG. 5 is an illustration of a natural roll vibration map.

As described above, the natural roll vibration map includes the period determination map of natural roll vibration, and the gain determination map of the natural roll vibration. For example, as shown in FIG. 5, the gain determination map of the natural roll vibration is based on a natural roll vibration gain curve X, the horizontal axis represents the increasing rate in the engine revolution speed Ne during a predetermined period Δt just before the $Ne_{th}$ is achieved, and the vertical axis on the right side represents the natural roll vibration gain. As a result of experiment performed by the inventors, the natural roll vibration gain curve X indicates that the larger the increasing rate in the engine revolution speed Ne during the predetermined period Δt (see FIG. 8A) just before the engine revolution speed Ne arrives at the predetermined threshold value $Ne_{th}$, the smaller the natural roll vibration gain, and the smaller the increasing rate in the engine revolution speed Ne during the predetermined period Δt just before that the engine revolution speed Ne arrives at the predetermined threshold value $Ne_{th}$, the larger the natural roll vibration gain.

Also, the period determination map of the natural roll vibration is based on a natural roll vibration period curve Y of the natural roll vibration map 623a, the horizontal axis represents the increasing rate in the engine revolution speed Ne during the predetermined period Δt just before the $Ne_{th}$ is achieved, and the vertical axis on the left side represents the natural roll vibration period. As a result of experiment performed by the inventors, the natural roll vibration period curve Y indicates that the larger the increasing rate in the engine revolution speed Ne during the predetermined period Δt just before the engine revolution speed Ne arrives at the predetermined threshold value $Ne_{th}$, the shorter the natural roll vibration period, and that the smaller the increasing rate in the engine revolution speed Ne during the predetermined period Δt just before the engine revolution speed Ne arrives at the predetermined threshold value $Ne_{th}$, the longer the natural roll vibration period.

In other words, when it takes long time for the engine revolution speed Ne to arrives at the predetermined threshold value $Ne_{th}$ at which the natural roll vibration occurs in the motoring state, the natural roll vibration tends to be amplified, the natural roll vibration period tends to become long, and the natural roll vibration gain tends to increase.

In the case of idling state, all-cylinder operation state, or selective cylinder operation state, based on the peak-to-peak value of the revolution change of the crankshaft from the vibrational state estimating unit 623, the timing of peak of the revolution change, the crank pulse signal from the engine ECU 73, and TDC pulse signal from each of the cylinders, the phase detector 624 compares the timing of peak of revolution change of the crankshaft and the timing of TDC, calculates the phase, and sends it to the actuator driving control unit 625.

The actuator driving control unit 625 receives it, and based on the engine revolution speed Ne signal, combines an aggregate of duty signals in a driving cycle in accordance with the third component of engine vibration, or the 1.5th order engine vibration. Next, the actuator driving control unit 625 performs to control driving the driving unit 41 (see FIG. 2) to extend and contract based on a phase calculated from the reference pulse per TDC so as to control each vibration of the front active control mount Ma and the rear active control mount Mb in every each cycles thereof to cancel the engine vibration.

For reference's sake, JP 2002-139095 A ([0050]-[0051], and FIGS. 5-6) discloses this control performed using an aggregate of duty signals in a driving cycle by the actuator driving control unit 625.

Next, each function of the vibrational state estimating unit 623, the phase detector 624, and the actuator driving control unit 625 when the rotational mode determination from the engine rotational mode determining unit 622 is a motoring state at the time of engine starting, will be explained.

In the above case, at the timing that the revolution speed Ne of the engine 102 is determined to exceed the predetermined threshold value $Ne_{th}$ at which the natural roll vibration occurs, the phase detecting unit 624 can decide a phase of the vibration at the timing that the engine revolution speed Ne is determined to exceed the predetermined threshold value $Ne_{th}$, based on the natural roll vibration cycle from the vibrational state estimating unit 623, the crank pulse signal from the engine ECU 73, and the TDC pulse signal from each of the cylinders. For this reason, the vibrational state estimating unit 623 and the phase detecting unit 624 delay a phase of the natural roll vibration gain for first two cycles of the natural roll vibration stored in the storage unit 623b at the time of engine starting the last time by predetermined time difference, and sends the phase to the actuator driving control unit 625 so as to send the phase to, for example, the rear active control mount $M_R$, and so as to send the half-cycle-delayed phase to the front active control mount $M_F$. For example, the above described predetermined time difference is preset depending on the crank angle.

The actuator driving control unit 625 receives it, combines an aggregate of duty signals, and performs output control so that the front active control mount $M_F$ and the rear active control mount $M_R$ extend and contract respectively so as to cancel the engine vibration waveform for two cycles of the vibration.

Further, when the natural roll vibration gain for third and subsequent cycles of the natural roll vibration of this time is input from the vibrational state estimating unit 623, the phase detecting unit 624 and the actuator driving control unit 625 receive it, and continue the vibration suppression control for the specified period.

(Vibration Isolating Function During Normal Operation)

In CPU 71b (see FIG. 3), in advance, based on information from the engine ECU 73 (see FIG. 3), it is determined whether the engine 102 (see FIG. 3) is in a selective-cylinder operation state in which selective-cylinders are in operation, or an all-cylinder operation state in which all cylinders are in operation. At the time of all-cylinder operation, since 6 times explosions occurs per two revolutions of the crankshaft, the crank angle for that vibration cycle is 120 degrees. In this vibration cycle, eight of crank pulses are output every 15 degrees of crank angle. Also, when the cylinders which are on one side bank are made to be non-operational, 3 times explosion occurs per two revolutions of the crankshaft, and the crank angle for that vibration cycle is 240 degrees. In this vibration cycle, sixteen of crank pulses are output.

For example, if the engine 102 is determined that it is in the all-cylinder operation state, the crank angle for the vibration cycle (in this case, 120 degrees) is determined. Next, eight of crank pulses in the vibration cycle are read so as to calculate a crank pulse interval.

That is, a crank angular velocity increases and the crank pulse interval decreases in explosion stroke of the engine 120, and the crank angular velocity decreases and the crank pulse interval increases in compression stroke of the engine 102. Otherwise, in the stroke in which the engine revolution speed Ne increases by depressing an accelerator pedal, the crank angular velocity increases and the crank pulse interval decreases. In the stroke in which the engine revolution speed Ne decreases by easing up on the accelerator pedal or depressing a brake pedal, the crank angular velocity decreases and the crank pulse interval increases. Therefore, the crank pulse interval includes one factor caused by variation in crank angular velocity associated with vibration in each vibration cycle of engine 102, and other factor caused by variation in crank angular velocity associated with increase/decrease in the engine revolution speed Ne.

The factor which has effect on controlling of the active vibration isolating support unit 101 in the above two factors is the former factor (variation in crank angular velocity associated with vibration), and the latter factor which has no effect on controlling of the active vibration isolating support unit 101 (variation in crank angular velocity associated with increase/decrease in engine revolution speed Ne) is excluded.

That is, the factor corresponds to a deviance for the crank pulse interval in the case where the crank angular velocity is constant.

As described above, when the engine 102 vibrates, it is possible to exhibit a vibration isolating function to suppress propagation of the vibration of the engine 102 to the vehicle body frame by making the active vibration isolating support apparatus 101 to extend and contract so as to follow the natural roll vibration of the engine 102 depending on the magnitude and phase of the vibration.

(Vibration Isolating Support Control to Natural Roll Vibration at the Time of Engine Starting)

Meanwhile, in the engine 102, an explosion of a fuel-air mixture in a combustion chamber generates force to push down a piston, and the force is converted to a rotary motion of the crankshaft via a connecting rod. As a result, a roll moment around the crankshaft acts on the engine 102 as a reaction of a rotation of the crankshaft. Since a variation frequency of this roll moment changes depending on the engine revolution speed Ne, when the variation frequency of the roll moment matches the roll natural frequency of the engine 102 at specific engine revolution speed Ne, a vehicle vibration which is uncomfortable for an occupant is generated.

Generally, since the roll natural frequency is lower than a vibration frequency at the engine revolution speed Ne (which is equal to or higher than an idling revolution speed) in a normal operating region of the engine 102, when the engine revolution speed Ne is lower than the idling revolution speed at the time of starting and stopping of the engine 102, the natural roll vibration of the engine 102 is generated, the engine 102 is vibrated largely, and the large vibration is transmitted to a vehicle body. This corresponds to the large vibration which is generated when a driver turns on a starter to start the engine 102. Therefore, in an embodiment explained below, the active vibration isolating support apparatus 101 is controlled so that the vehicle vibration caused by the natural roll vibration of the engine 102 at the time of motoring status before the initial explosion in the engine 102 is effectively protected.

(Process of ACM Control at the Time of Engine Starting)

Next, referring to FIGS. 3-8, a process of an ACM control of the natural roll vibration suppression at the time of engine starting in accordance with this embodiment will be explained.

Figure 8A:
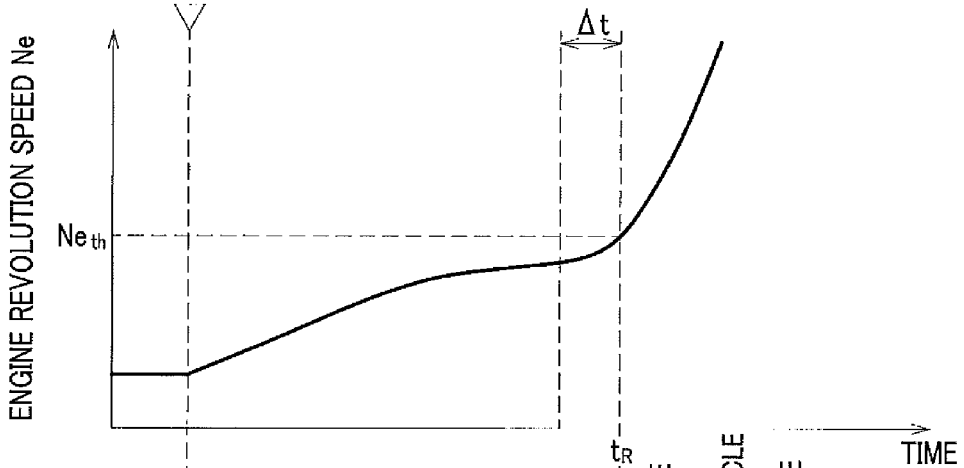
FIGS. 8A-8C are illustrations of the ACM control at the time of engine starting, where
Figure 8B:
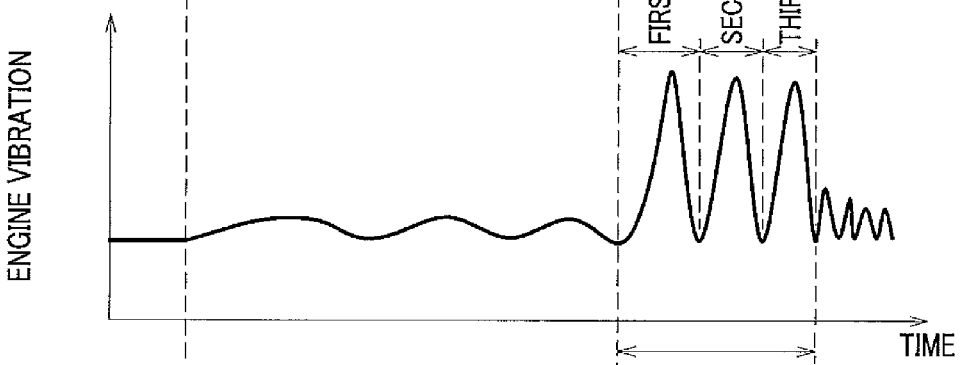
Figure 8C:
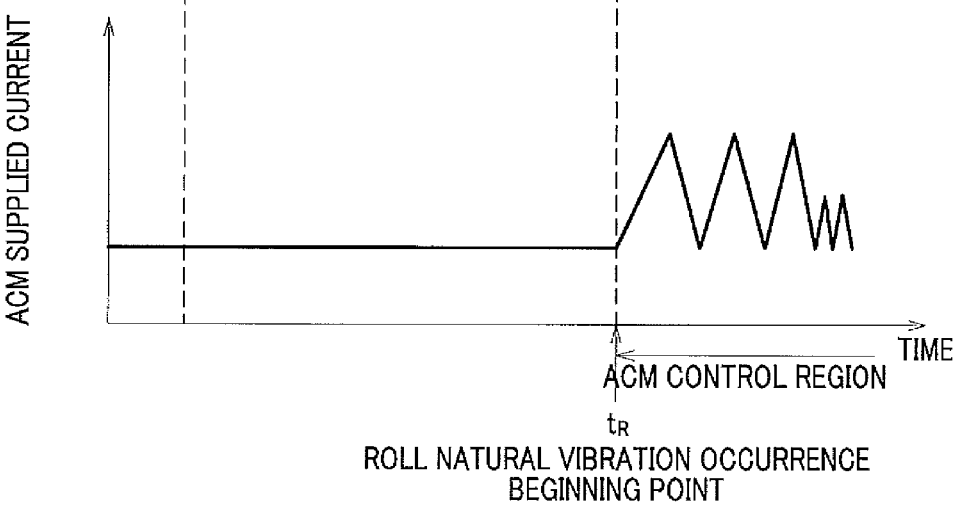

FIGS. 6 and 7 is a flowchart showing the process of an ACM control (natural roll vibration suppression control) for the natural roll vibration at the time of engine starting. FIGS. 8A-8C are illustrations of the ACM control at the time of engine starting, where FIG. 8A is an illustration of a temporal transition of an engine revolution speed Ne; where FIG. 8B is an illustration of an temporal transition of the engine vibration; and where FIG. 8C is an illustration of a temporal transition of an ACM supplied current.

This control is performed in the engine revolution mode determination unit 622, the vibrational state estimating unit 623, the phase detecting unit 624, and the actuator driving control unit 625 which are realized by the CPU 71b (see FIG. 3) running programs stored in ROM.

Although the control of each step of the flowchart shown in FIGS. 6 and 7 is mainly performed by the vibrational state estimating unit 623, steps S1 and S3 are performed by the engine revolution mode determination unit 622.

In step S1, the engine revolution mode determination unit 622 checks whether the engine starts or not (IG-SW ON?). If "IG-SW ON" (Yes), the process proceeds to step S2. If not, step S1 is repeated.

In addition, if "IG-SW ON", DC-current is supplied to the driving unit 41 of the active control mount M, and the second elastic body is sucked and moved to a virtual zero point.

In step S2, the vibrational state estimating unit 623 reads the nearest predetermined number of data Ne, and store them temporarily. Here, the nearest predetermined number of data Ne means the data of values of the engine revolution speed Ne which are measured during a predetermined interval and predetermined number of which are stored temporarily.

In step S3, the engine revolution mode determination unit 622 checks whether a fuel injection signal is absent or not (motoring state?). If the fuel injection signal is absent (Yes), the process proceeds to step S4. If not, the process proceeds to a connector (B), and the series of control is completed as shown in FIG. 7.

In step S4, an increasing rate in the engine revolution speed Ne is calculated from the obtained data Ne.

In step S5, it is checked whether the engine revolution speed Ne is greater than or equal to a predetermined threshold value $Ne_{th}$. Here, the threshold value $Ne_{th}$ for determination is a value based on the data obtained by experiment, and is the value at which the natural roll vibration occurs in the engine.

If the engine revolution speed Ne is greater than or equal to the predetermined threshold value $Ne_{th}$ for determination, the process proceeds to step S6. If not, the process returns to step S2, and steps S2-S5 are repeated.

In step S6, the increasing rate in the engine revolution speed Ne calculated in step S4 is stored temporarily.

In FIG. 8A, the horizontal axis represents the time, and the vertical axis on the left side represents the engine revolution speed Ne. "IG-SW ON" indicates the engine starting, and a natural roll vibration occurrence beginning point $t_R$ is a point of time at which the engine revolution speed Ne arrives at the predetermined threshold value $Ne_{th}$ at which the natural roll vibration occurs. The natural roll vibration occurrence beginning point $t_R$ is also a point of time at which the vibrational state estimating unit 623 decides that the natural roll vibration is started.

$\Delta t$ is a predetermined period just before which the value of the engine revolution speed Ne arrives at the predetermined threshold value $Ne_{th}$ at which the natural roll vibration occurs, and is a period during which the nearest predetermined number of data Ne is measured in step S2.

In addition, in step S2, the temporarily stored data Ne may be a data Ne periodically sampled during the predetermined time period (not a predetermined number of), and the increasing rate in the engine revolution speed Ne may be calculated from the periodically sampled data Ne is step S4.

Returning to the flowchart shown in FIG. 6, in step S7, the ACM control data (the natural roll vibration gain) for the first and second cycles of the natural roll vibration stored at the time of engine starting the last time is read from the storage unit 623b.

In step S8, the ACM control data read from the storage unit 623b is sent to the actuator driving control unit 625.

By the above process, the actuator driving control unit 625 controls the natural roll vibration for the first and second cycles.

After that, the process proceed to step S9 shown in FIG. 7 via a connector (A).

Next, controlling of the natural roll vibration for the third and subsequent cycles will be explained.

In step S9, referring to the increasing rate in the engine revolution speed Ne, based on the period determination map (see FIG. 5) of the natural roll vibration stored in the data unit 623a, including a determination whether the ACM control of the third and subsequent cycles of the natural roll vibration should be done or not, an ACM control period of the third and subsequent cycles of the natural roll vibration is determined as needed (referring to the increasing rate in Ne, based on the period determination map of the natural roll vibration, the ACM control period of the third and subsequent cycles of the natural roll vibration is determined).

In step S10, the result of determination whether the ACM control of the third and subsequent cycles is needed in step S9 is checked. If not needed (Yes), the process proceeds to step S13. If needed (No), the process proceeds to step S11.

In step S11, referring to the increasing rate in the engine revolution speed Ne, based on the gain determination map (see FIG. 5) of the natural roll vibration, the natural roll vibration gain is determined. That is, based on the natural roll vibration map 623a stored in the data unit 623a, the natural roll vibration gain is determined.

In step S12, the ACM control data (the natural roll vibration period, and the natural roll vibration gain) of the natural roll vibration determined in steps S9 and S11 is sent to the actuator driving control unit 625.

The actuator driving control unit 625 receives it, and based on the engine revolution speed Ne signal, combines an aggregate of duty signals in a driving cycle. Next, the actuator driving control unit 625 performs to control driving the driving unit 41 (see FIG. 1) to extend and contract based on a phase calculated from the reference pulse per TDC so as to control each vibration of the front active control mount Ma and the rear active control mount Mb in every each cycles thereof to cancel the engine vibration.

For reference's sake, JP 2002-139095 A ([0071]-[0072], and FIGS. 5-6) discloses this control performed using an aggregate of duty signals in a driving cycle by the actuator driving control unit 625.

In step S13, referring to the increasing rate in the engine revolution speed Ne temporarily stored in step S6, for the next time engine starting, the natural roll vibration gain for the first and second cycles of the natural roll vibration of this time is stored in the storage unit 623b.

As described above, the series of natural roll vibration suppression control in the motoring state at the time of starting engine 102 is completed.

Here, the control gain of the natural roll vibration which is determined based on the natural roll vibration map shown in FIG. 5 is uniquely determined for the period of the natural roll vibration. Although the control after the above period is not explained, it is desirable to complete the natural roll vibration suppression control smoothly so that that the gain is attenuated exponentially.

Here, steps S1 and S3 in the flowchart correspond to "motoring state detecting means" in claims, step S5 corresponds to "natural roll vibration detecting means" in claims, and steps S9-S11 corresponds to "natural roll vibrational state information obtaining means" in claims respectively.

In FIG. 8B, the horizontal axis represents the time, and the vertical axis on the left side represents the magnitude of the engine vibration. When the value of the engine revolution speed Ne arrives at the predetermined threshold value $Ne_{th}$ at which the natural roll vibration occurs at the time $t_R$, the natural roll vibration begins. In this figure, the case where the natural roll vibration period continues to the third cycles is illustrated. Also, because the natural roll vibration is controlled to the third cycle as the control period in step S9, the natural roll vibration is suppressed in subsequent cycles to be attenuated.

In FIG. 8C, the horizontal axis represents the time, and the vertical axis on the left side represents a transition of a target value of the ACM supplied current. Here, the ACM supplied current for one of the active control mounts $M_F$ and $M_R$ is illustrated.

The ACM supplied current means a current which is supplied when the actuator driving control unit 625 combines an aggregate of duty signals, and performs output control so that the front active control mount $M_F$ and the rear active control mount $M_R$ extend and contract respectively so as to cancel the natural roll vibration waveform. An ACM control region shown in FIG. 8C means a period during which the suppression control of the natural roll vibration is performed. The time $t_R$ is the natural roll vibration occurrence beginning point, the natural roll vibration suppression control is performed by a fixed value control gain for three cycles, and after that, the control gain is attenuated.

According to this embodiment, the engine revolution mode determination unit 622 detects "IG-SW ON", confirms no fuel injection signal at the time of engine starting, and decides whether the engine is in the motoring state. If the engine revolution mode determination unit 622 determines that the engine is in the motoring state, the vibrational state estimating unit 623 determines that the natural roll vibration occurs when the engine revolution speed Ne arrives at the predetermined threshold value $Ne_{th}$. Also, the vibrational state estimating unit 623 sends the ACM control data (the natural roll vibration period, and the natural roll vibration gain) for the first and second cycles of the natural roll vibration stored at the time of engine starting the last time to the actuator driving control unit 625 during the first and second cycles of the natural roll vibration so as to perform the ACM control. That is, the problem that the natural roll vibration in the motoring state can not be suppressed can be solved. Therefore, for example, even if the computing speed of the microcomputer is limited, the ACM control can be performed quickly and appropriately from the beginning of the natural roll vibration.

Also, with respect to the ACM control for the third and subsequent cycles, referring to the increasing rate in the engine revolution speed Ne, when the engine revolution speed Ne arrives at the predetermined threshold value $Ne_{th}$ at which the natural roll vibration occurs, the vibrational state estimating unit 623 determines whether the natural roll vibration period continues to the third and subsequent cycles (i.e., whether the ACM control is needed for the third and subsequent cycles) based on the period determination map of the natural roll vibration, and determines the natural roll vibration gain of the natural roll vibration for the third and subsequent cycles as needed. If it is determined that the ACM control of the natural roll vibration for the third and subsequent cycles is needed, the ACM control data for the natural roll vibration based on the period determination map of the natural roll vibration is sent to the actuator driving control unit during the number of the third and subsequent cycles so as to perform the ACM control.

Even if the period of the natural roll vibration is long, based on the increasing rate in the revolution speed Ne of the engine of this time, the ACM control can be performed during necessary period. Also, because the ACM control data for the third and subsequent cycles is determined when the engine revolution speed Ne arrives at the threshold value $Ne_{th}$, the ACM control data can be sent to the actuator driving control unit 625 in time for the third and subsequent cycles of the natural roll vibration even if the computing speed of the microcomputer and a control period of a program are limited.

Modified Embodiment

In the above described embodiment, in the ACM control for the first and second cycles, the ACM control data (the natural roll vibration gain) for the first and second cycles of the natural roll vibration stored at the time of engine starting the last time is stored in the storage unit 623b for the suppression control of the natural roll vibration, but should not limited to that. That is, in the flowcharts shown in FIGS. 6 and 7, assume that steps S7, S8, S10, and S13 are omitted, and that not only the ACM control for the third and subsequent cycles, but also a continued period of the natural roll vibration (i.e., the ACM control period) is determined in step S9. Also, in step S11, the natural roll vibration gain can be obtained based on the continued period, and the ACM control may be performed.

The above modification can be applied when data processing capability of the microcomputer is improved.

What is claimed is:

1. An active vibration isolating support apparatus in which an engine is elastically supported in a vehicle body, and a controller estimates a vibrational state of the engine based on an output from a sensor to detect a revolution change of the engine and drives an actuator to extend and contract so as to suppress transmission of vibration, comprising:
    a motoring state detecting unit configured to detect that the engine is in a motoring state at the time of the engine starting before actuating the engine;
    a natural roll vibration detecting unit configured to detect occurrence of a natural roll vibration based on a detected revolution speed of the engine when the motoring state detecting unit detects that the engine is in the motoring state; and
    a natural roll vibrational state information obtaining unit configured to obtain a natural roll vibrational state information based on an increasing rate in the revolution speed of the engine when the natural roll vibration detecting unit judges that the natural roll vibration has been started,
    wherein the natural roll vibrational state information maps a relationship between the increasing rate in the engine revolution speed and a natural roll vibration period such that the smaller the increasing rate in the engine revolution speed, the longer the natural roll vibration period,
    wherein natural roll vibration suppression control is performed based on the obtained natural roll vibrational state information when the motoring state detecting unit detects that the engine is in the motoring state, and
    wherein the natural roll vibrational state information includes a period determination map of the natural roll vibration and a control gain determination map of the natural roll vibration which are preset based on the increasing rate in the revolution speed.

2. The active vibration isolating support apparatus of claim 1, further comprising:
    a storage unit configured to store natural roll vibration controlling data for first and second cycles of the natural roll vibration in advance,
    wherein when an occurrence of the natural roll vibration of the engine is detected, the natural roll vibration suppression control is performed for the first and second cycles of the natural roll vibration using the stored natural roll vibration controlling data, and
    the natural roll vibration suppression control is performed for third and subsequent cycles of the natural roll vibration depending on the natural roll vibrational state information obtained for the first and second cycles.

3. The active vibration isolating support apparatus of claim 1, wherein the natural roll vibration detecting unit is further configured to detect an occurrence of the natural roll vibration when the detected revolution speed of the engine becomes a predetermined threshold value.

4. The active vibration isolating support apparatus of claim 1, wherein the natural roll vibration state information obtaining unit is further configured to obtain the natural roll vibrational state information which depends on the increasing rate of the revolution speed of the engine during a period of time of a predetermined length immediately before a point in time that the revolution speed of the engine becomes a predetermined threshold value.

5. A method for controlling an active vibration isolating support apparatus in which an engine is elastically supported in a vehicle body, and a controller estimates a vibrational state of the engine based on an output from a sensor to detect a revolution change of the engine and drives an actuator to extend and contract so as to suppress transmission of vibration, the method comprising:
    detecting that the engine is in a motoring state at the time of the engine starting before actuating the engine;
    detecting an occurrence of a natural roll vibration based on a detected revolution speed of the engine subsequent to detecting that the engine is in the motoring state;
    obtaining natural roll vibrational state information based on an increasing rate in the revolution speed of the engine upon the detection of the occurrence of the natural roll vibration; and
    performing natural roll vibration suppression control based on the obtained natural roll vibrational state information,
    wherein the natural roll vibrational state information includes a period determination map of the natural roll vibration and a control gain determination map of the natural roll vibration which are preset based on the increasing rate in the revolution speed
    wherein the natural roll vibrational state information maps a relationship between the increasing rate in the engine revolution speed and a natural roll vibration period such that the smaller the increasing rate in the engine revolution speed, the longer the natural roll vibration period.

6. The method for controlling an active vibration isolating support apparatus of claim 5, further comprising:
    storing natural roll vibration controlling data for first and second cycles of the natural roll vibration in advance,
    wherein when an occurrence of the natural roll vibration of the engine is detected, the natural roll vibration suppression control is performed for the first and second cycles of the natural roll vibration using the stored natural roll vibration controlling data, and
    the natural roll vibration suppression control is performed for third and subsequent cycles of the natural roll vibration depending on the natural roll vibrational state information obtained for the first and second cycles.

7. The method for controlling an active vibration isolating support apparatus of claim 5, wherein the detection of the occurrence of the natural roll vibration included determining that the detected revolution speed of the engine becomes a predetermined threshold value.

8. The method for controlling an active vibration isolating support apparatus of claim 5, wherein the obtaining of the natural roll vibrational state information depends on the increasing rate of the revolution speed of the engine during a period of time of a predetermined length immediately before a point in time that the revolution speed of the engine becomes a predetermined threshold value.

* * * * *